(12) United States Patent
Wang et al.

(10) Patent No.: US 12,067,195 B2
(45) Date of Patent: Aug. 20, 2024

(54) CONTROL METHOD AND ELECTRONIC DEVICE

(71) Applicant: Lenovo (Beijing) Co., Ltd., Beijing (CN)

(72) Inventors: Ke Wang, Beijing (CN); Zhaohui Jia, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/139,597

(22) Filed: Dec. 31, 2020

(65) Prior Publication Data

US 2021/0200418 A1 Jul. 1, 2021

(30) Foreign Application Priority Data

Dec. 31, 2019 (CN) .......................... 201911418318.0

(51) Int. Cl.
*G06F 3/0354* (2013.01)
*G06F 1/16* (2006.01)
*G06F 3/038* (2013.01)
*G06F 3/041* (2006.01)

(52) U.S. Cl.
CPC .......... *G06F 3/04186* (2019.05); *G06F 1/162* (2013.01); *G06F 1/1647* (2013.01); *G06F 3/03545* (2013.01); *G06F 3/038* (2013.01); *G06F 3/04162* (2019.05); *G06F 2200/1632* (2013.01)

(58) Field of Classification Search
CPC ...... G06F 1/1626; G06F 1/162; G06F 1/1616; G06F 1/1647; G06F 3/03545; G06F 3/038; G06F 3/0416; G06F 3/04162; G06F 2200/1632; G06F 1/1652; G06F 3/04883; G06F 3/04845; G06F 1/1641; G06F 3/0487
See application file for complete search history.

(56) References Cited

U.S. PATENT DOCUMENTS

| 10,719,145 | B1* | 7/2020 | Files | G06F 1/169 |
| 2004/0049743 | A1* | 3/2004 | Bogward | G06F 1/1626 |
| | | | | 715/262 |
| 2010/0151913 | A1 | 6/2010 | Park | |
| 2013/0050141 | A1* | 2/2013 | Park | G06F 3/046 |
| | | | | 345/174 |
| 2013/0212535 | A1* | 8/2013 | Kim | G06F 3/04886 |
| | | | | 715/841 |

(Continued)

FOREIGN PATENT DOCUMENTS

| CN | 101907921 A | 12/2010 |
| CN | 106598418 A | 4/2017 |

(Continued)

*Primary Examiner* — Dismery Mercedes
(74) *Attorney, Agent, or Firm* — ANOVA LAW GROUP, PLLC

(57) ABSTRACT

A control method includes determining an application (APP) running front-end on an electronic device, in response to a first APP running front-end on the electronic device, obtaining a first operation mode of an operating member, and at least displaying an operation window of the first APP on a screen interface of the electronic device at a first target position matching the first operation mode. The first operation mode includes a left-hand mode or a right-hand mode.

14 Claims, 6 Drawing Sheets

(56) References Cited

U.S. PATENT DOCUMENTS

| | | | | |
|---|---|---|---|---|
| 2013/0222238 A1* | 8/2013 | Sliger | ............... | G06F 3/04886 |
| | | | | 345/157 |
| 2014/0152576 A1* | 6/2014 | Kim | ................. | G06F 3/04886 |
| | | | | 345/169 |
| 2014/0180481 A1* | 6/2014 | Park | ................. | G06F 3/03545 |
| | | | | 700/275 |
| 2015/0062097 A1* | 3/2015 | Chung | ............. | H04M 1/0245 |
| | | | | 345/184 |
| 2016/0054851 A1* | 2/2016 | Kim | .................. | G06F 3/0482 |
| | | | | 345/174 |
| 2016/0162149 A1* | 6/2016 | Lee | .................. | G06F 3/04817 |
| | | | | 715/835 |
| 2017/0075479 A1* | 3/2017 | Tsukamoto | ......... | G06F 1/3262 |
| 2017/0359910 A1* | 12/2017 | Seo | .................... | G06F 1/1601 |
| 2018/0181245 A1* | 6/2018 | Beck | ................. | G06F 3/04883 |
| 2018/0330694 A1* | 11/2018 | Klein | ..................... | G06F 1/32 |
| 2019/0163432 A1* | 5/2019 | Files | ..................... | G06F 3/147 |
| 2019/0258298 A1* | 8/2019 | Arima | ................. | G06F 3/0393 |
| 2020/0076940 A1* | 3/2020 | Kim | .................. | G06F 1/1656 |
| 2021/0056878 A1* | 2/2021 | Lee | ..................... | G06F 3/041 |

FOREIGN PATENT DOCUMENTS

| | | | |
|---|---|---|---|
| CN | 107153481 | A | 9/2017 |
| CN | 107291361 | A | 10/2017 |
| CN | 107704186 | A | 2/2018 |
| CN | 107908382 | A | 4/2018 |
| CN | 109885268 | A | 6/2019 |

\* cited by examiner

CONTROL METHOD AND ELECTRONIC DEVICE

CROSS-REFERENCE TO RELATED APPLICATION

This application claims priority to Chinese Patent Application No. 201911418318.0, filed on Dec. 31, 2019, the entire content of which is incorporated herein by reference.

TECHNICAL FIELD

The present disclosure generally relates to the smart control field of the electronic device and, more particularly, to a control method and an electronic device.

BACKGROUND

Nowadays, when a user opens an application (APP) running on an electronic device, such as a cellphone, a laptop, etc., the electronic device displays an operation window of the APP at a default position, or at a position set by the user, e.g., based on pull or drag operations. The electronic device cannot perform position adaptation on the operation window of the APP automatically and intelligently.

SUMMARY

Embodiments of the present disclosure provide a control method. The method includes determining an application (APP) running front-end on an electronic device, in response to a first APP running front-end on the electronic device, obtaining a first operation mode of an operating member, and displaying an operation window of the first APP on a screen interface of the electronic device at a first target position matching the first operation mode. The first operation mode includes a left-hand mode or a right-hand mode.

Embodiments of the present disclosure provide an electronic device, including a display screen, a memory, and a processor. The memory stores at least an instruction set. The processor is configured to call and execute the instruction set in the memory to determine an APP running front-end on the electronic device, respond to a first APP running front-end on the electronic device to obtain a first operation mode of the operating member, and display an operation window of the first APP on a screen interface of the display screen of the electronic device at a first target position matching the first operation mode. The first operation mode includes a left-hand mode or a right-hand mode.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

Technical solutions of embodiments of the present disclosure are described in detail in connection with the accompanying drawings below. Described embodiments are merely some embodiments of the present disclosure but not all embodiments. Based on embodiments of the present disclosure, all other embodiments obtained by those of ordinary skill in the art without creative effort should be within the scope of the present disclosure.

The present disclosure provides a control method and an electronic device, which may automatically and intelligently adapt an operation window of an application (APP) at a suitable position of a screen interface of the device based on an actual operation situation of a user. The control method and the electronic device of the present disclosure are described by embodiments of the present disclosure.

Figure 1:
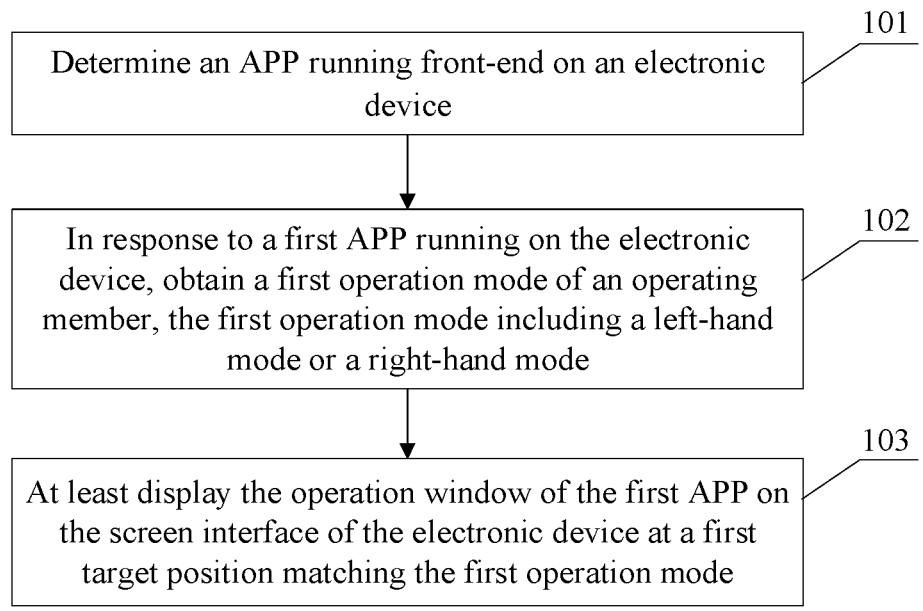
FIG. 1 illustrates a schematic flowchart of a control method according to some embodiments of the present disclosure.

FIG. 1 illustrates a schematic flowchart of the control method according to some embodiments of the present disclosure. This method may be applied to the electronic device. The electronic device may include but not limited to a portable terminal device, such as a smartphone, a personal digital assistant, a laptop computer, etc., or a portable computer (e.g., laptop), a desktop, or an all-in-one computer in a general-purposed/specific-purposed computer or configuration environment.

Further, the electronic device may include a single-screen device having a display screen or a dual/multi-screen device having two or more display screens.

As shown in FIG. 1, in embodiments of the present disclosure, the control method includes the following processes, for example.

At 101, the method includes determining an APP running front-end on the electronic device.

In some embodiments, the APP running front-end on the electronic device may refer to an APP, which includes an operation window displayed on a screen interface of the display screen of the electronic device. That is, during running, the APP may push the operation window on the display screen interface at the front end of the electronic device and may be directly observed by the user.

The operation window of the APP may include but be not limited to a user-oriented window formed by an information display interface, a dialogue box, a functional operation interface, etc. In some embodiments, the electronic device may be configured to perform detection on operation information of the user to know the APP running front-end on the electronic device. For example, the electronic device may detect operation start information when the user starts an APP, or function operation information of a/some function operations executed by the user on an opened APP. In some other embodiments, the electronic device may be configured to detect progress information of the electronic device and interface status information of the electronic device to know the APP running front-end on the electronic device.

At 102, the method includes responding to a specific first APP running at the front end of the electronic device to obtain a first operation mode of an operating member. The first operation mode includes a left-hand mode or a right-hand mode.

The specific first APP may include an APP set by the user according to actual needs, or an APP configured before the electronic device leaves the factory.

In some embodiments, the first APP may include an APP correlated to left-hand and right-hand operation modes of the user. For the first APP at a fixed position of the electronic device, the user may have relatively large differences in operation comfortability, convenience, and operation efficiency when the user uses the first APP based on the left-hand mode and the right-hand mode.

The first APP may exemplarily include but not limited to any one of a writing APP, a note-taking APP, a virtual keyboard/virtual mouse APP, a game APP, an electronic musical instrument APP (e.g., a virtual electronic organ), etc. The first APP may further include other APPs correlated to the left-hand and right-hand operation modes of the user, which is not limited according to various embodiments of the present disclosure.

The left-hand mode or right-hand mode in the first operation mode of the operating member may include a left-hand operation mode or a right-hand operation mode. When the user uses a corresponding operating member of a finger, a hand palm, a stylus, a (virtual) mouse/keyboard, etc., to perform an operation on the electronic device, the left-hand operation mode or the right-hand operation mode may refer to an operation mode matching the left hand or the right hand of the user. For example, the user may use the left hand to touch the electronic device, grip the stylus, operate the mouse, etc., which form the left-hand mode.

The first APP is correlated to the left-hand and right-hand modes of the user. Thus, to use the first APP more efficiently, comfortably, and conveniently, when determining the specific first APP running front-end on the electronic device, the electronic device may obtain the first operation mode of the operating member.

At the moment of determining the specific first APP running front-end on the electronic device, the electronic device may detect information related to the operating member in real-time. The electronic device may determine whether the first operation mode is the left-hand mode or the right-hand mode based on the detected information of the operating member.

In some embodiments, the electronic device may further read the first operation mode of the operating member detected and cached before. For example, assume that when the user uses the note-taking APP (e.g., set the note-taking APP as the specific first APP), the electronic device may detect the first operation mode to be the left-hand mode and save information of the first operation mode. Thus, when the user closes the note-taking APP and continues to open a virtual mouse APP, the electronic device may not need to detect the first operation mode of the user in real-time but may read the cache to obtain the first operation mode of the user to be the left-hand mode.

An application habit of the user is usually relatively consistent. For example, when a left-handed user closes an APP and continues to open another APP, the electronic device may directly read the operation mode information cached in the last APP as the operation mode information of the user in the present APP. As such, the electronic device may maintain a relatively high accuracy of the operation mode, unless the user changes the operation mode or the user of the electronic device changes. In some embodiments, in combination with a time factor, the electronic device may read the previous cache within a predetermined time length as the first operation mode information of the present user. When excessing the predetermined time length, the electronic device may obtain the first operation mode information of the user based on the detection manner and start timing again. The electronic device may also be configured to obtain the first operation mode information of the user based on an intelligent learning manner according to the application history of the user. The electronic device may be configured to learn the operation mode habit of the user in different time periods, which is not limited by embodiments of the present disclosure.

At 103, the method includes displaying at least the operation window of the first APP on the screen interface of the electronic device at a first target position matching the first operation mode.

After obtaining the first operation mode of the operating member, the electronic device may at least perform position adaptation on the operation window of the first APP based on the first operation mode of the operating member. The electronic device may further at least display the operation window of the first APP on the screen interface of the electronic device at the first target position matching the first operation mode of the operating member.

For example, assume that the first operation mode of the operating member includes the left-hand mode, the electronic device may at least display the operation window (e.g., a virtual keyboard, and a virtual mouse) of the first APP at a certain area to the left (corresponding to the left hand of a user) of the screen interface of the electronic device. Similarly, if the first operation mode of the operating member includes the right-hand mode, the electronic device may at least display the operation window of the first APP at a certain area to the right (corresponding to the right hand of the user) on the screen interface of the electronic device.

For a device having a large screen, for example, a cell phone with a large screen, a tablet, and a dual-screen device, after using the solution of the present disclosure, the device has beneficial effects. For example, when the user uses the virtual keyboard at the device having a large screen, if the device displays the virtual keyboard at a middle area or a right area on the screen by default, the left-handed user may operate the keyboard difficultly. The user needs to extend the left hand across a corresponding area of the screen to operate a corresponding key. After applying the solution of the present disclosure, the device may automatically adapt the virtual keyboard to the corresponding area at the left side of the screen interface based on the left-hand operation mode of the user. As such, the operation efficiency, the operation convenience, and the operation comfort may be improved.

In practical applications, the electronic device may include processing logic of the present disclosure as a local function by integrating the processing logic into an operating system of the electronic device. The electronic device may also use the processing logic as an external function in form of an application software installed on the electronic device. The user may choose whether to use this function when operating the electronic device through operations of setting/configuration.

The control method of embodiments of the present disclosure may include responding to the specific first APP running front-end on the electronic device to obtain the first operation mode of the operating member, the first operation mode of the operating member including the left-hand mode or right-hand mode, and further displaying at least the operation window of the first APP on the screen interface of the electronic device at the first target position matching the first operation mode of the operating member. As such, based on the solution of the present disclosure, for the specific first APP, the electronic device may be configured to at least display the operation window of the first APP at a suitable position matching the operation mode of the left-hand mode or right-hand mode of the operating member. Thus, the electronic device may be configured to automatically and intelligently perform the position adaptation on the operation window of the APP based on the actual operation situation of the user to facilitate the user to use the electronic device.

Figure 2:
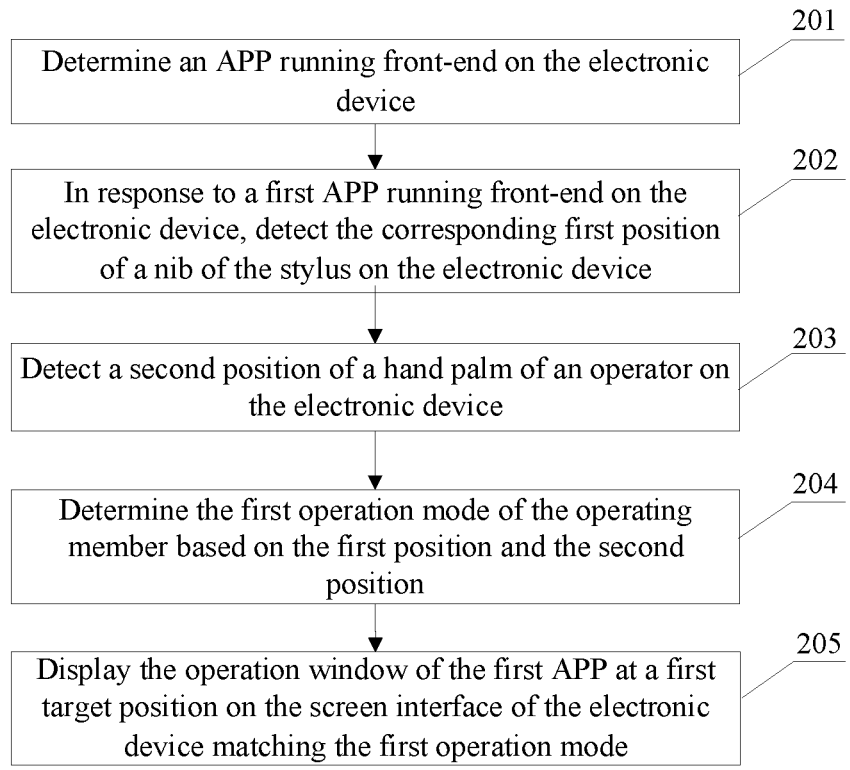
FIG. 2 illustrates a schematic flowchart of another control method according to some embodiments of the present disclosure.

In some embodiments, FIG. 2 illustrates another schematic flowchart of the control method according to some embodiments of the present disclosure. The control method includes the following processes.

At 201, the method includes determining the APP running front-end on the electronic device.

For the detailed processing process of process 201, reference may be made to the description of process 101, which is not repeated here.

At 202, the method includes responding to the specific first APP running front-end on the electronic device and detecting the corresponding first position of a nib of the stylus on the electronic device.

If the electronic device determines that the specific first APP is the APP running front-end on the electronic device, that is, the APP is correlated to the left-hand and the right-hand operation modes of the operator, such as handwriting APP, virtual keyboard, high click rate game. Thus, the electronic device may respond to the first APP running front-end on the electronic device to obtain the first operation mode of the operator.

In some embodiments, the present disclosure provides a possible implementation of the first operation mode of the user for the scene of the user using the stylus to perform a device operation (e.g., write, click to read, high click game operation).

In some embodiments, the electronic device may respond to the specific first APP running front-end on the electronic device to detect the corresponding first position of the nib of the stylus on the electronic device. The first position may include a corresponding position of the nib on the electronic device when the nib of the stylus contacts or is close to the electronic device, that is the first position.

In some other embodiments, for example, according to a pressure sensing principle, the electronic device may be configured to detect contact pressure of the nib of the stylus at the display screen of the electronic device. Correspondingly, the electronic device may detect the contact pressure position of the nib of the stylus at the display screen of the electronic device, that is the first position.

At 203, the method includes detecting a second position of a hand palm of the operator on the electronic device.

The operator may use the stylus to perform corresponding operations on the electronic device, such as using the stylus to take notes, click the virtual keyboard, and perform click small game. The hand palm of the operator (or a portion of the hand palm) may contact or be close to the screen of the display screen of the electronic device.

As such, the second position of the hand palm of the operator on the electronic device may include a corresponding position of the hand palm on the electronic device when the hand palm contacts or is close to the electronic device. Correspondingly, based on technologies such as touch sensing, capacitance detection, and/or pressure sensing, the electronic device may detect the second position of the hand palm of the operator on the electronic device.

At 204, the method includes determining the first operation mode of the operating member based on the first position and the second position.

In some embodiments, besides detecting the first position of the nib of the stylus on the electronic device, the electronic device may be configured to detect the second position of the hand palm of the operator on the electronic device. As such, the electronic device may be configured to determine whether the first operation mode of the operating member is the left-hand mode or the right-hand mode based on the position relationship of the first position and the second position.

In some embodiments, in the different operation modes of the left hand and right hand, position relationships between the first position of the nib of the stylus and the second position of the hand palm of the operator may be correspondingly different. Assume that a side of the device corresponding to the left hand of the operator on the display screen of the electronic device is the left side of the device, and a side of the device corresponding to the right hand of the operator is the right side of the device. In the left-hand mode, the first position of the nib of the stylus on the electronic device may include the right side of the second position of the hand palm on the electronic device. In the right-hand mode, the first position of the nib of the stylus on the electronic device may include the left side of the second position of the hand palm on the electronic device.

As such, in some embodiments, correspondence between the left-hand mode and right-hand mode and the different position relationships of the first position and the second position may be predetermined. The electronic device may be further configured to determine the positional relationship between the first position and the second position to determine whether the first operation mode of the operator is the left-hand mode or the right-hand mode.

In some embodiments, the electronic device may be configured to determine the positional relationship between the first position and the second position by setting another reference system as a reference (not use the left side or right side as the reference), which is not limited by embodiments of the present disclosure.

Processes 202 to 204 may be a specific implementation of process 102.

At 205, the method includes at least displaying the operation window of the first APP at the screen interface of the electronic device at the first target position matching the first operation mode.

For the detailed processing process of process 205, reference may be made to the related description of process 103, which is not repeated here.

In some embodiments, the electronic device may be configured to determine the first operation mode according to the corresponding first position of the nib of the stylus on the electronic device and the corresponding second position of the hand palm of the operator on the electronic device. The electronic device may be further configured to at least display the APP window of the first APP of the screen interface of the electronic device at the first target position matching the first operation mode of the operator. As such, the electronic device may be configured to automatically and intelligently perform adaptation on the position of the corresponding operation window according to the actual operation situation of the operator to facilitate the operator to apply the electronic device.

Figure 3:
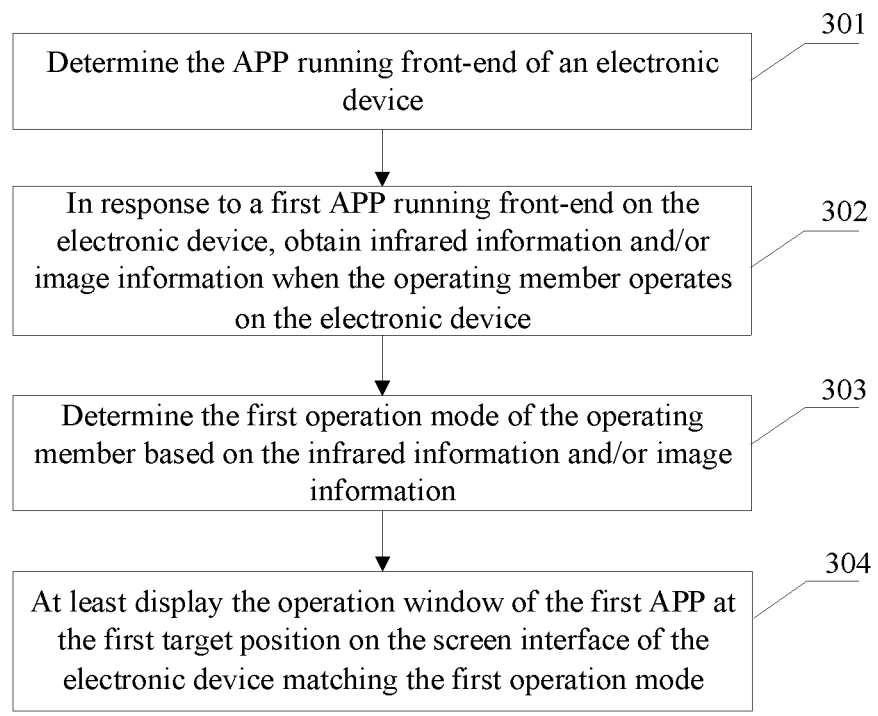
FIG. 3 illustrates a schematic flowchart of another control method according to some embodiments of the present disclosure.

In some embodiments, FIG. 3 illustrates another schematic flowchart of the control method according to some embodiments of the present disclosure. The control method includes the following processes.

At 301, the method includes determining the APP running front-end on the electronic device.

For the detailed processing process of process 301, reference may be made to the description of process 101, which is not repeated here.

At 302, the method includes responding to the specific first APP running front-end on the electronic device to obtain infrared information and/or image information when the operating member is operated on the electronic device.

The electronic device responds to the specific first APP running front-end on the electronic device to obtain the first operation mode of the operating member. As another possible implementation, the method further includes collecting the infrared information and/or image information when the operating member is operated on the electronic device based on an infrared device and/or an image collection device of the electronic device.

In some embodiments, for example, the electronic device may be configured to collect to obtain the infrared image information and/or Red-Green-Blue (RGB) image information of the operating member (e.g., hand, stylus, or hand and stylus) of the operator based on an infrared imaging device and/or a camera of a laptop.

At 303, the method includes determining the first operation mode of the operating member based on the infrared information and/or image information.

As such, the electronic device may be configured to perform infrared feature analysis and/or image feature analysis on the infrared information and/or the image information of the operating member. The electronic device may be further configured to match the infrared feature and/or image feature obtained from the analysis with the pre-stored left-hand feature and the right-hand feature to recognize whether the first operation mode of the operating member is the left-hand mode or the right-hand mode.

The left-hand mode feature may include pre-fetched and stored operating member feature of the operator in the left-hand mode, such as shapes, sizes, and/or position relationship features of the fingers of the left hand, orientation feature of the nib of the stylus gripped by the left hand, relative position feature of the nib and a stylus body, features of inclined directions of the fingers/stylus, etc. Similarly, the right-hand features may include pre-fetched and stored operating member feature of the operator in the right-hand mode.

Processes 302 to 303 may be another implementation of process 102.

In process 304, the method includes at least displaying the operation window of the first APP on the screen interface of the electronic device at the first target position matching the first operation mode.

For the detailed processing process of process 304, reference may be made to the related description of process 103, which is not repeated here.

In embodiments of the present disclosure, the electronic device may be configured to determine the first operation mode of the operator through the infrared information and/or image information when the operating member is operated on the electronic device. The electronic device may be configured to at least display the APP window of the first APP on the screen interface of the electronic device at the first target position matching the first operation mode of the operator. As such, the electronic device may automatically and intelligently perform adaptation on the operation window of the APP according to the actual operation situation of the operator to facilitate the operator to use the electronic device.

Figure 4:
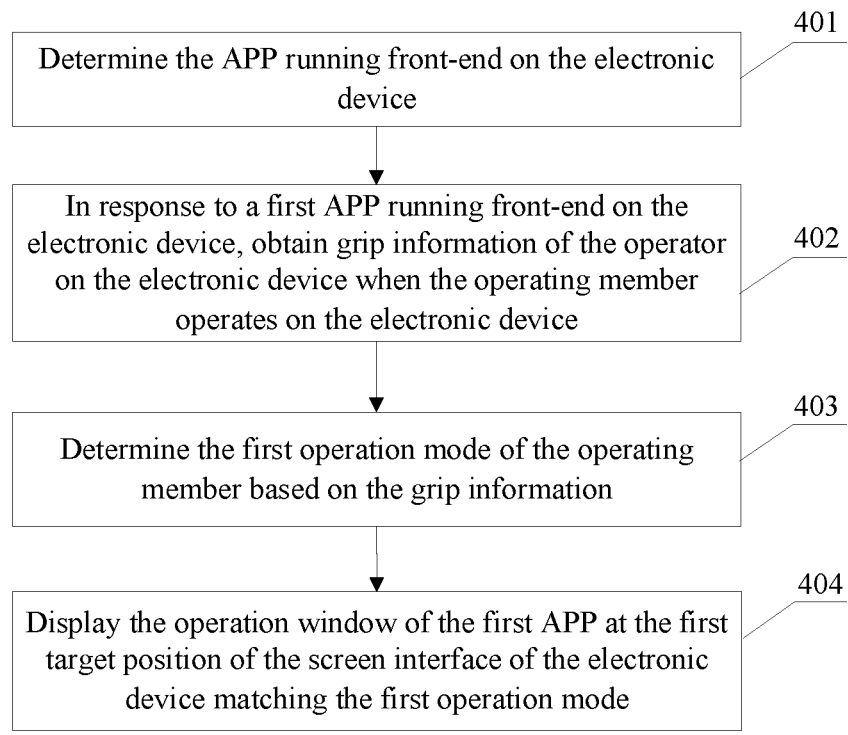
FIG. 4 illustrates a schematic flowchart of another control method according to some embodiments of the present disclosure.

In embodiments of the present disclosure, FIG. 4 illustrates another schematic flowchart of the control method according to some embodiments of the present disclosure. The control method includes the following processes.

At 401, the method includes determining the APP running front-end on the electronic device.

For the detailed processing process of process 401, reference may be made to the description of process 101, which is not repeated here.

At 402, the method includes responding to the first APP running front-end on the electronic device to obtain grip information of the operator for the electronic device when the operating member is operated on the electronic device.

The electronic device may respond to the first APP running front-end on the electronic device to obtain the first operation mode of the operating member. As another implementation, the electronic device may be further configured to detect the grip information of the operator for the electronic device. The grip information may include the grip information of the operator for the electronic device when the operating member is operated on the electronic device.

The grip information of the operator for the electronic device may include but be not limited to grip position information.

The electronic device may be configured to use a capacitance sensor to sense capacitance or an elastic wave sensor to detect pressure changes to detect the grip information such as the grip position of the operator for the electronic device.

At 403, the method includes determining the first operation mode of the operating member based on the grip information.

After obtaining the grip information, the electronic device may determine whether the grip of the operator for the electronic device is a left-hand grip or a right-hand grip based on the grip information such as the grip position. The electronic device may further determine whether the first operation mode of the operating member is the left-hand mode or the right-hand mode based on the left-hand grip or right-hand grip of the operator.

Different electronic devices may have different sizes. The electronic devices of different sizes may include different grips or operation features. For example, for a cell phone with a small screen, the user may operate the electronic device by using a single hand operation mode. Thus, the operator may use a same hand to grip and operate the cell phone. Under this situation, the grip mode may be consistent with the left-hand operation mode or the right-hand operation mode. That is, if the operator uses the left-hand grip, the first operation mode of the operating member may include the left-hand mode. If the operator uses the right-hand grip, the first operation mode of the operating member may include the right-hand mode. For a cell phone with a large screen, a tablet, and a dual-screen electronic device, the operator may need to use both hand operation mode to grip and operate the electronic device. Under this situation, the grip mode may be opposite to the left-hand operation mode or the right-hand operation mode. If the operator uses the left-hand grip, the first operation mode of the operating member may include the right-hand mode. If the operator uses the right-hand grip, the first operation mode of the operating member may include the left-hand mode.

In some embodiments, after determining whether the operator uses the left-hand grip or the right-hand grip based on the grip information of the operator, the electronic device may determine whether the first operation mode of the operating member is the left-hand mode or the right-hand mode in connection with a screen size of the electronic device.

The electronic device may almost determine the left-hand mode and the right-hand mode in connection with the grip information and the screen size, which is however not definitive. For example, for a cell phone with a large screen, the operator may still use a single hand to grip and operate the electronic device. Thus, to further improve the recognition accuracy of the first operation mode of the operating member, another factor may be combined to integrate the first operation mode of the operating member. For example, when the operating member operates, the capacitance may change a direction (e.g., when the operator uses the single hand to grip and operate, the capacitance may have a change feature of starting from a grip side and eventually returning to the grip side. When the operator uses both hands to grip and operate, the capacitance may include a similar change feature at another side opposite to the grip side, and the capacitance on the grip side is relatively stable), and the pressure may change a direction.

Processes 402 to 403 may be another implementation of process 102.

At 404, the method includes at least displaying the operation window of the first APP of the screen interface of the electronic device at the first target position matching the first operation mode.

For the detailed processing process of process 404, reference may be made to the related description of process 103, which is not repeated here.

In embodiments of the present disclosure, the electronic device may be configured to determine the first operation mode of the operator by using the grip information of the operating member on the electronic device or by combining with another factor. The electronic device may be further configured to at least display the APP window of the first APP of the screen interface of the electronic device at the first target position matching the first operation mode of the operator. Thus, the electronic device may automatically and intelligently perform the adaptation on the position of the operation window according to the actual operation situation of the operator to facilitate the operator to use the electronic device.

In embodiments of the present disclosure, as the electronic device of an operation body of the control method, the electronic device may include a multi-screen device having a plurality of display screens. For example, the electronic device may include a dual-screen device having two display screens. In some embodiments, the electronic device may be described as an example of the dual-screen device to provide another implementation of the present disclosure.

Figure 5:
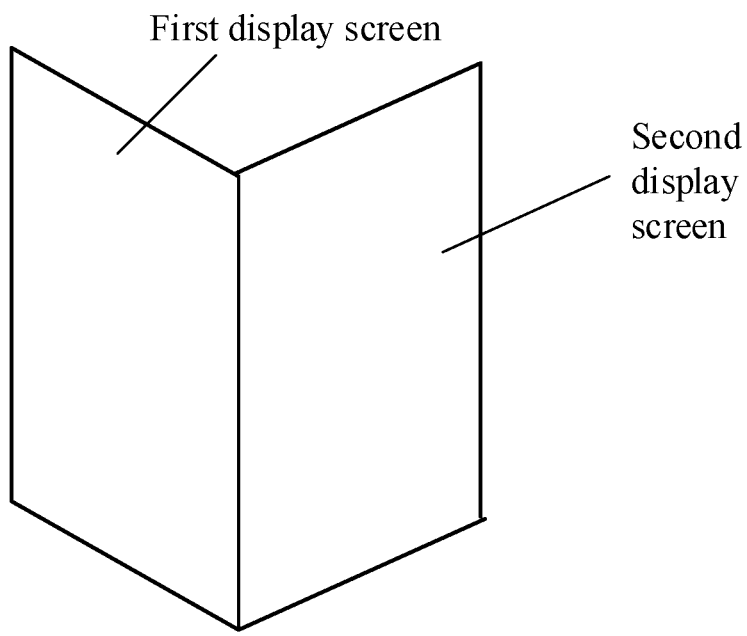
FIG. 5 illustrates a schematic diagram showing a form of a dual-screen electronic device in a book mode according to some embodiments of the present disclosure.

As shown in FIG. 5, a dual-screen electronic device includes a first display screen and a second display screen. The first display screen and the second display screen may include an angle satisfying the user's needs in the application. According to the structure and shape design of the product, the angle may range from 0° to 180° or from 0° to 360°.

The dual-screen electronic device may be applied in a plurality of device modes, including a book mode, a laptop mode, and a tablet mode.

Figure 6:
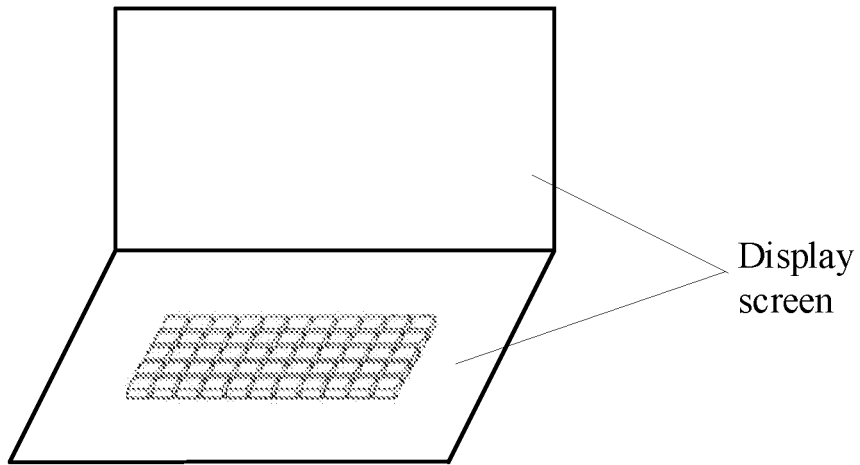
FIG. 6 illustrates a schematic diagram showing a form of the dual-screen electronic device in a notebook mode according to some embodiments of the present disclosure.

As shown in FIG. 5, the electronic device is in the book mode, that is, a left-right mode. As shown in FIG. 6, in the laptop mode, the electronic device forms a shape similar to a laptop computer. A display screen parallel to a table surface may show the virtual keyboard to be used as a keyboard when needed. Another display screen having an angle with the table surface (e.g., perpendicular) may display the interface to open the related APP. A difference from a laptop is that in the laptop mode, the screen parallel to the table surface may also not be used as the virtual keyboard for use but as an expansion screen of the other display screen. The laptop mode may also be considered as an up and down mode. The tablet mode may be considered as an expansion mode, in which the two screens are expanded to form a tablet for use.

The dual-screen device includes a plurality of device modes, and the display screens of the dual-screen device may have different attitudes and positions in different device modes. Thus, in some embodiments, when responding to the specific first APP running front-end on the electronic device, the electronic device may perform the adaptation on the position of the operation window of the first APP by referring to the first operation mode of the operating member. In addition, the electronic device may perform the adaptation on the position of the operation window of the first APP by combining the device mode of the electronic device as a reference.

Figure 7A:
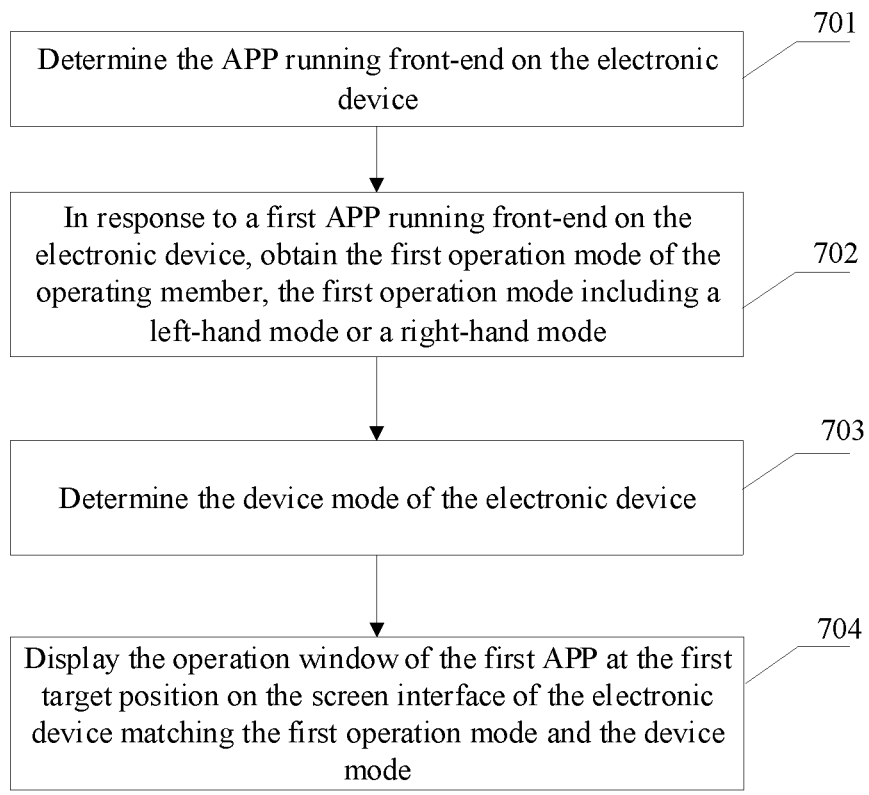
FIG. 7a illustrates a schematic flowchart of another control method according to some embodiments of the present disclosure.

In some embodiments, as shown in FIG. 7a, the control method provided by the present disclosure includes the following processes.

At 701, the method includes determining the APP running front-end on the electronic device.

At 702, the method includes responding to the first APP running front-end on the electronic device to obtain the first operation mode of the operating member. The first operation mode includes a left-hand mode or a right-hand mode.

Processes 701 to 702 correspond to processes 101 to 102. For the description of processes 701 to 702, reference may be made to the related description of processes 101 to 102, which are not repeated here.

At 703, the method includes determining the device mode of the electronic device.

The electronic device may perform attitude sensing on the electronic device to obtain attitude sensing information of the electronic device. The electronic device may further determine the device mode of the electronic device based on the obtained attitude sensing information.

In some embodiments, the electronic device may use attitude sensing devices such as a gravity sensor, an inclination sensor, and/or a gyroscope integrated into the electronic device to obtain the attitude information of the electronic device. The attitude information of the electronic device may include but be not limited to an angle between the two display screens of the electronic device, and air attitude information of any one or two display screens of the electronic device.

In some embodiments, the inclination sensor may be pre-integrated on a connection shaft between the two display screens of the electronic device. The attitude sensing devices of the gravity sensor and/or the gyroscope may be integrated on a motherboard of the at least one display screen. The inclination sensor on the connection shaft may be configured to detect the angle between the two display screens. The electronic device may preliminarily determine whether the electronic device is in the tablet mode or not based on the detected angle. If the electronic device is not in the tablet mode, the electronic device may further determine the air attitude (e.g., both display screens have angles with the horizontal plane, or one of the two display screens is parallel with the horizontal plane) of at least one display screen of the electronic device according to the attitude information of the at least one display screen output by the attitude sensing device. Correspondingly, the electronic device may determine whether the electronic device is in the book mode or the laptop mode.

At 704, the method includes at least displaying the operation window of the first APP on the screen interface of the electronic device at the first target position matching the first operation mode and the device mode.

In embodiments of the present disclosure, when performing position adaptation on the operation window of the first APP, the electronic device may at least display the operation window of the first APP at the position on the screen interface of the electronic device matching the first operation mode and the device mode by referring to two aspect factors. The two aspect factors may include the first operation mode of the operating member and the device mode of the electronic device.

The first APP may be the APP correlated with the left-hand and right-hand operation modes of the user, which may include but not limited to various APPs, such as a writing/note-taking APP, a virtual keyboard, a game, an electronic instrument, etc.

Embodiments of the present disclosure provide an example of performing the position adaptation on the APP window of the first APP based on the two aspect factors. In the example, the current first APP of the user may include the writing/note-taking APP. During using the APP, in addition to opening a handwriting window, the user may open a reference window simultaneously. As such, the user may refer to information content (e.g., a word/excel/ppt file or a web page) to take corresponding notes.

Figure 7B:
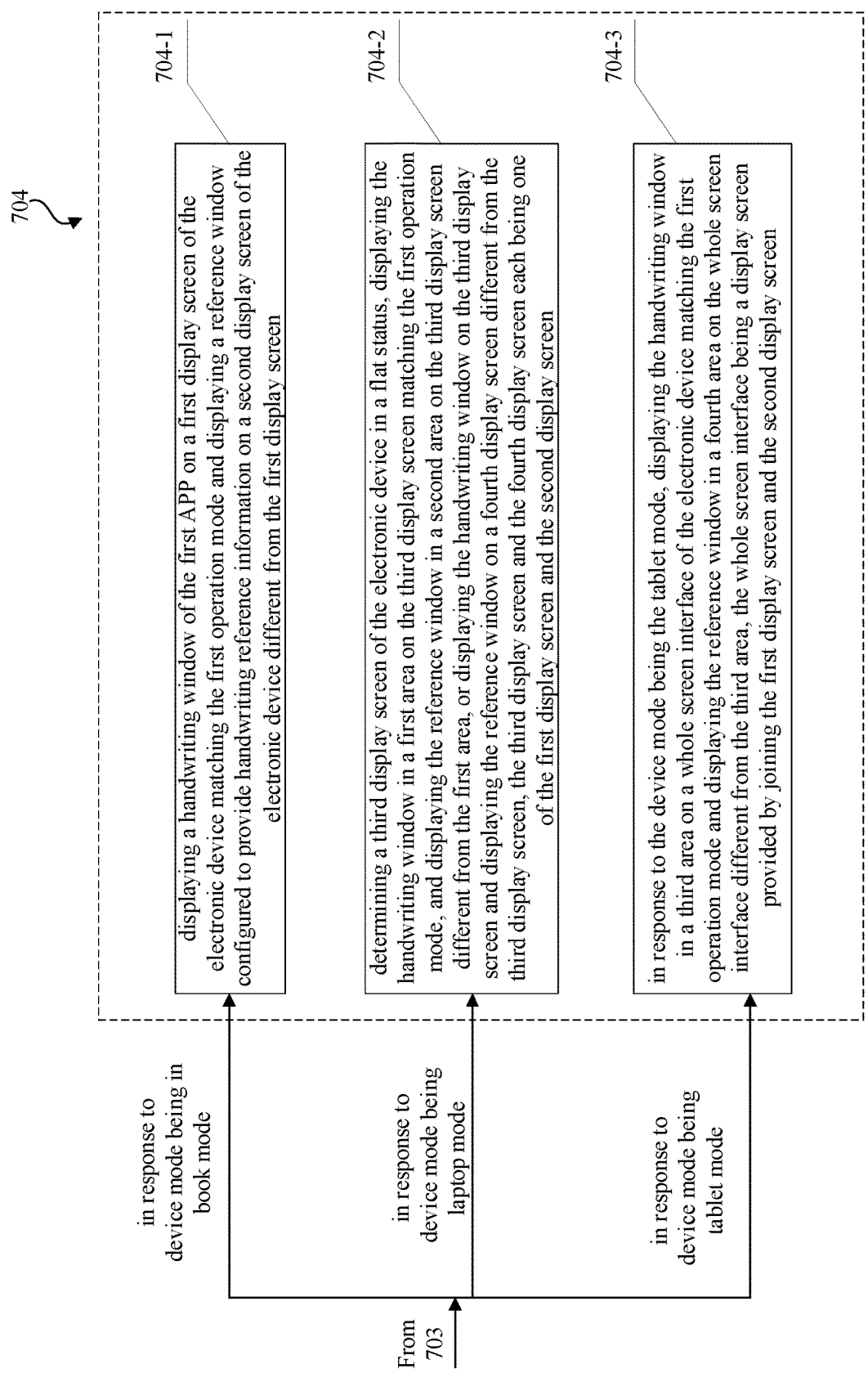
FIG. 7b illustrates a schematic flowchart of the control method according to some embodiments of the present disclosure.

Referring to FIG. 7b, for an application situation of the example, performing the position adaptation on the APP window of the first APP (writing/note-taking APP) includes the following implementations.

At 704-1, if the device mode is in the book mode, the electronic device may display the handwriting window of the first APP at the first display screen of the electronic device matching the first operation mode. The electronic device may display the reference window used to provide handwriting reference information on the second display screen different from the first display screen.

At 704-2, if the device mode is in the laptop mode, the electronic device may determine a third display screen in a flat status. The electronic device may display the handwriting window at a first area on the third display screen matching the first operation mode and display the reference window at a second area on the third display screen different from the first area. In another manner, the electronic device may display the handwriting window on the third display screen and display the reference window on a fourth display screen different from the third screen. The third screen and the fourth screen each may include one of the first screen and the second screen, respectively.

At 704-3, if the device mode is in the tablet mode, the electronic device may display the handwriting window at a third area on the whole screen interface of the electronic device matching the first operation mode. The electronic device may display the reference window at the fourth area of the whole screen interface different from the third area. The whole screen interface may be a screen interface provided by joining the first display screen and the second display screen.

In some embodiments, the electronic device may perform the position adaptation on another APP in other forms, for example, for a gaming scene, assume that the user plays in the single-hand operation mode. If the electronic device detects that the user operates with the left hand, the electronic device may dynamically adjust an interface portion (e.g., a certain area operated by the user) related to an operation of a game interface to a position opposite to the left hand of the user. The electronic device may correspondingly and dynamically adjust other interface portions (e.g., not operated, only for search and reference of the user) to another position. In the book mode of the dual-screen device, the electronic device may adaptively divide the game interface into two areas. The electronic device may dynamically adjust each area onto a corresponding display screen according to the left-hand and right-hand gaming modes. For another device mode, the electronic device may adaptively configure a correspondence of the position of the gaming window and the operation mode of the user according to the actual application situation, which is not described in detail here.

In some embodiments, when running the first APP at the front end of the electronic device, the electronic device may dynamically adjust the window position of the first APP in combination with the device mode and the left-hand and right-hand operation modes of the operator. As such, the position of the operation window of the first APP may be more suitable for the operation situation of the operator and the device attitude. Thus, the application efficiency and comfort of the operator for the electronic device may be further improved.

Above embodiments describes the implementations of performing the position adaptation on the specific first APP, when the specific first APP running front-end on the electronic device is detected. Before starting the specific first APP, the present disclosure further provides an implementation of automatically starting the specific first APP according to the operation mode of the operator.

Figure 8:
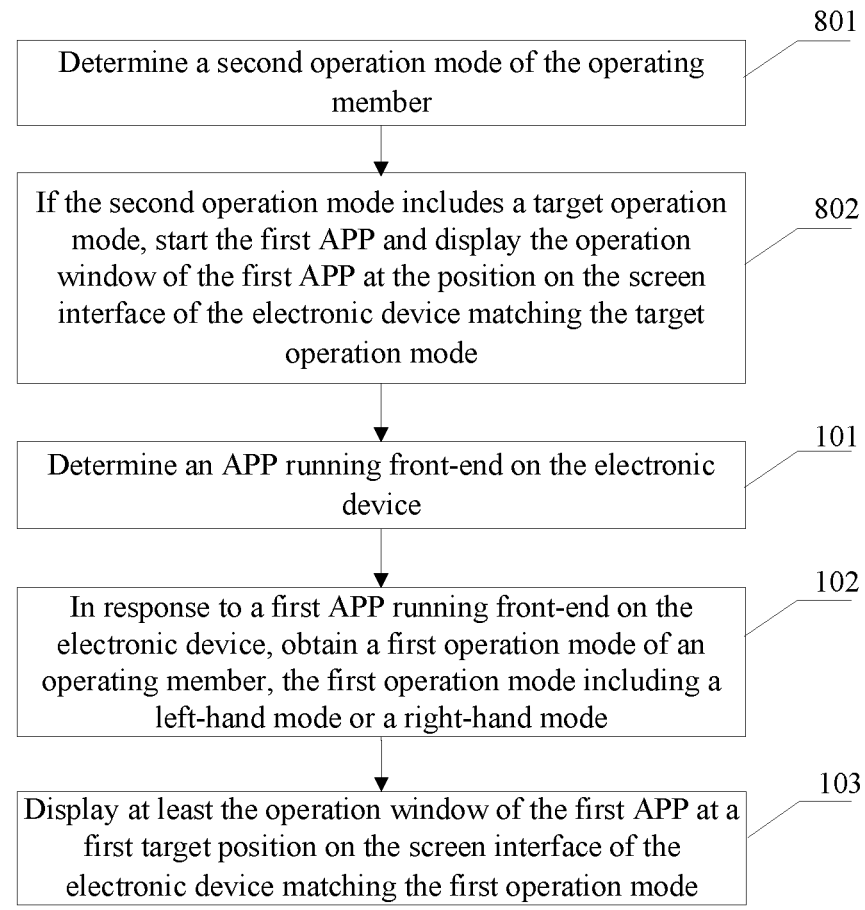
FIG. 8 illustrates a schematic flowchart of another control method according to some embodiments of the present disclosure.

Wither reference to FIG. 8, in some embodiments, before process 101 (determining the APP running front-end on the electronic device), the control method further includes the following processes.

At 801, the method includes determining a second operation mode of the operating member.

In some embodiments, the electronic device may perform pre-condition detection before starting the first APP, which may detect the intention of the operator and determine an operation mode to enter based on the intention.

Correspondingly, the second operation mode may be considered as the operation mode to enter corresponding to the operation intention of the operator. The second operation mode may include but be not limited to a handwriting mode corresponding to the handwriting intention of the operator based on a stylus, and a touch mode corresponding to the touch intention of the operator.

The handwriting intention based on the stylus may include but be not limited to note writing intention based on the stylus or another intention correlated to the stylus, such as picture drawing, gaming intention for a high click rate game APP.

For example, assume thon the electronic device may detect the proximity of the fingers of the user by a proximity capacitive sensor. The electronic device may preliminarily determine the intention of the user to be a touch operation. Correspondingly, the second operation mode of the operating member may include the touch mode.

For another example, in a case thon the electronic device may detect that the stylus is pulled out of a pen slot of the electronic device (e.g., a touch plate or a pin may be arranged in the pen slot, once the stylus is pulled out a signal may be triggered to inform the motherboard of the device). The electronic device may also detect that the operator grips the stylus by manners of infrared detection/image detection to reveal that the operator has the handwriting purpose. Correspondingly, the second operation mode may be determined as the handwriting mode.

The electronic device may further determine the handwriting mode to be a left-hand handwriting mode or a right-hand handwriting mode according to the left-hand grip or right-hand grip of the operator for the stylus (e.g., a difference from the above left-hand mode and the right-hand mode is that the left-hand mode and the right-hand mode here are more tend to an intention aspect).

At 802, if the second operation mode includes a target operation mode, the method includes starting the first APP and displaying the operation window of the first APP at the position on the screen interface of the electronic device matching the target operation mode.

In some embodiments, the target operation mode may include a mode correlated to the left-hand mode and the right-hand mode of the operator. Exemplarily, the electronic device may configure the target operation mode as the handwriting mode based on the stylus (e.g., divided into left-hand handwriting and right-hand handwriting). The first APP may include an APP correlated to the left-hand and right-hand modes of the operator.

In some embodiments, the electronic device may set correspondence between the target operation mode and the first APP according to a strategy or a priority level. Once detecting that the second operation mode of the operating member includes the target operation mode, the electronic device may automatically start the first APP corresponding to the target operation mode.

For example, assume that the target operation mode may include the handwriting mode, and the first APP may include the note-taking APP. When detecting that the stylus leaves the pen slot, or the operator grips the stylus, and correspondingly determining the second operation mode of the operating member to be the handwriting mode, the electronic device may automatically start the note-taking APP of the electronic device. Further, if detecting the handwriting mode to be the left-hand mode or the right-hand mode (e.g., the operator grips the stylus with the left hand or the right hand), when starting the note-taking APP, the electronic device may automatically display the APP window of the APP at the position on the screen interface of the electronic device matching the left-hand mode or right-hand mode.

In some embodiments, the electronic device may obtain the intention of the operator and the operation mode to enter by detecting the pre-condition before starting the APP. When the operation mode includes the target operation mode correlated to the specific first APP, the electronic device may automatically start the first APP and display the APP window of the first APP at the position on the screen interface of the electronic device matching the target operation mode. An idea of detecting the pre-condition based on the purpose may be realized. The electronic device may automatically start the specific APP and perform intelligent adaptation on the position of the window of the specific APP to further facilitate the operator to use the electronic device.

For the control method, embodiments of the present disclosure further provide an electronic device. The electronic device may include but not limited to a portable terminal device, such as a smartphone, a personal digital assistant, a tablet computer, or a portable computer (e.g., a laptop), a desktop, or an all-in-one computer in a general/specific-purpose computing or configuration environment.

Figure 9:
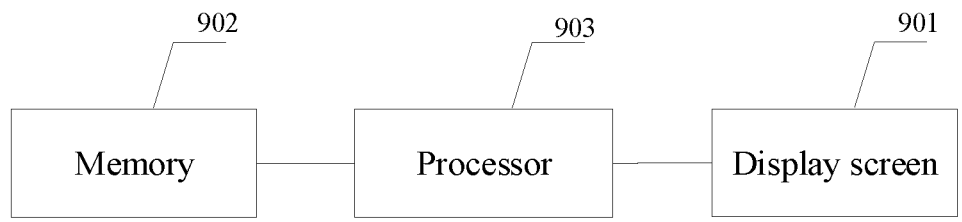
FIG. 9 illustrates a schematic structural diagram of an electronic device according to some embodiments in the present disclosure.

With reference to FIG. 9, in some embodiments, the electronic device at least includes a display screen 901, a memory 902, and a processor 903.

The electronic device may include one or more display screens 901. Correspondingly, the electronic device may include a single-screen device having one display screen or a dual/multi-screen device having two or more display screens.

The memory 902 may be configured to at least store a group of instruction sets.

The processor 903 may be configured to call and execute the instruction sets stored in the memory. By executing the instruction sets, the processor 903 may be configured to determine the APP running front-end on the electronic device, respond to the specific first APP running front-end on the electronic device to obtain the first operation mode of the operating member, and display at least the operation window of the first APP on the screen interface of the display screen of the electronic device at the first target position matching the first operation mode. The first operation mode may include a right-hand mode and a left-hand mode.

In some embodiments, the electronic device may be configured to obtain the APP running front-end on the electronic device by detecting the operator operation information. For example, the electronic device may detect the start operation information when the operator starts an APP or detect the functional operation information that the operator has performed a/some functional operations on an opened APP. In some other embodiments, the electronic device may be configured to know the APP running front-end on the electronic device by detecting the progress information of the electronic device and the interface status information of the electronic device.

In some embodiments, the first APP includes an APP correlated to the left-hand and right-hand operation modes of the operator. For the first APP at a fixed position of the electronic device, relative great differences may exist in operation comfort, convenience, and operation efficiency when the operator uses the first APP based on the left-hand mode and the right-hand mode.

The first APP is correlated to the left-hand operation mode and the right-hand operation mode of the operator. To cause the operator to use the first APP more efficiently, more comfortably, and more conveniently, when determining the specific first APP running front-end on the electronic device, the electronic device may obtain the first operation mode of the operating member.

At the moment of determining the specific first APP running front-end on the electronic device, the electronic device may detect related information of the operating member in real-time and determine whether the first operation mode is the left-hand mode or the right-hand mode based on the detected operating member information.

In some embodiments, the electronic device may also read the first operation mode of the operating member, which is detected and cached before, to obtain the first operation mode of the operator.

After obtaining the first operation mode of the operating member, based on the first operation mode of the operating member, the electronic device may at least perform the position adaptation on the operation window of the first APP. Moreover, the electronic device may at least display the operation window of the first APP at the first target position on the screen interface of the electronic device matching the first operation mode of the operating member.

The electronic device of embodiments of the present disclosure may at least display the operation window at a suitable position matching the operation mode, such as the left-hand mode or the right-hand mode of the operating member for the specific first APP. Thus, the electronic device may automatically and intelligently perform the position adaptation on the operation window corresponding to the actual operation situation of the operator to facilitate the operator to use the electronic device.

In some embodiments, the processor 903 of the electronic device may be configured to obtain the first operation mode of the operating member through the following processes.

In some embodiments, the processor 903 may be configured to detect the first position of the nib of the stylus on the electronic device, detect the second position of the hand palm of the operator on the electronic device, and determine the first operation mode of the operating member based on the first position and the second position.

In some other embodiments, the processor 903 may be configured to obtain the infrared information and/or the image information when the operating member is operated on the electronic device and determine the first operation mode of the operating member based on the infrared information and/or the image information.

In some other embodiments, the processor 903 may be configured to obtain the grip information of the operator for the electronic device when the operating member is operated on the electronic device, and determine the first operation mode of the operating member based on the grip information.

In some embodiments, the electronic device may include the multi-screen device having a plurality of display screens. For example, the electronic device may include a dual-screen device having two display screens. The dual-screen device may be applied in a plurality of device modes, including the book mode, the laptop mode, and the tablet mode.

Under this situation, the processor 903 of the electronic device may be further configured to determine the APP running front-end on the electronic device, respond to the specific first APP running front-end on the electronic device to obtain the first operation mode of the operating member, determine the device mode of the electronic device, and at least display the operation window of the first APP at the first target position on the screen interface of the electronic device matching the first operation mode and the device mode. The first operation mode may include the left-hand mode or the right-hand mode.

The attitude sensing may be performed on the electronic device to obtain the attitude sensing information of the electronic device. Further, based on the obtained attitude sensing information, the device mode of the electronic device may be determined.

In some embodiments, when performing the position adaptation on the operation window of the first APP, the processor 903 may take the two aspect factors of the first operation mode of the operating member and the device mode of the electronic device as references. As such, the processor 903 may be configured to at least display the operation window of the first APP at the position on the screen interface of the electronic device matching the first operation mode and the device mode.

In some embodiments, when the first APP runs at the front end of the electronic device, in connection with the device mode and the left-hand and right-hand operation modes of the operator, the processor 903 may dynamically adjust the position of the operation window of the first APP. Thus, the position of the operation window of the first APP may be more suitable for the operator operation status and the device mode. Therefore, the application efficiency and comfort of the operator for the electronic device may be further improved.

In some embodiments, before determining the APP running front-end on the electronic device, the processor 903 of the electronic device may determine the second operation mode of the operating member. If the second operation mode is the target operation mode, the processor 903 of the electronic device may start the first APP and display the operation window of the first APP at the position on the screen interface of the electronic device matching the target operation mode.

In some embodiments, the pre-condition may be detected before starting the first APP. The pre-condition detection includes detecting the intention of the operator and determining the operation mode to enter based on the intention.

In some embodiments, the processor 903 may be configured to obtain the intention of the operator and the operation mode to enter through the pre-condition detection before starting the APP. When the operation mode includes the target operation mode correlated to the specific first APP, the processor 903 may automatically start the first APP and display the APP window of the first APP at the position on the screen interface of the electronic device matching the target operation mode. Thus, the processor 903 may be configured to automatically start the specific APP and perform intelligent adaptation on the position of the APP window based on the idea of detecting the pre-condition of the intention to further facilitate the operator to use the electronic device.

Various embodiments in this specification are described in a progressive manner. Each embodiment focuses on the differences from other embodiments. For the same and similar parts between various embodiments, reference may be made to each other.

For convenience of description, when the above system or device is described, the functions are divided into various modules or units to be described separately. When the present disclosure is implemented, functions of each unit may be implemented in the same one or more software and/or hardware.

According to the description of embodiments of the present disclosure, those skilled in the art may understand that the present disclosure may be implemented by software and a necessary general hardware platform. Based on this understanding, the technical solution of the present disclosure essentially or the part that contributes to the existing technology may be represented in the form of a software product. The software product may be stored in a storage medium, such as a read-only memory/random access memory (ROM/RAM), a magnetic disk, an optical disk, etc., including several instructions used to cause a computer device (e.g., a personal computer, a server, a network device, etc.) to execute the method described in embodiments or some parts of embodiments of the present disclosure.

Finally, in the specification, relational terms such as first, second, third, and fourth are only used to distinguish one entity or operation from another entity or operation but not used to require or imply any such actual relationship or sequence between these entities or operations. Moreover, the terms "include," "contain," or any other variants are intended to cover non-exclusive inclusion, so that a process, method, article, or device including a series of elements includes not only those elements, but also includes other elements not clearly listed, or also includes elements inherent to this process, method, article, or device. If there are no more restrictions, the element defined by the sentence "include a . . . " does not exclude the existence of another identical element in the process, method, article, or device that includes the element.

The above-described embodiments are merely some embodiments of the present disclosure. For those of ordinary skill in the art, without departing from the principle of the present disclosure, several improvements and modifications may be made, and these improvements and modifications are within the scope of the present disclosure.

What is claimed is:

1. A control method, comprising:
    determining an application (APP) running front-end on an electronic device;
    in response to a first APP being displayed on a front-end of the electronic device, obtaining a first operation mode of an operating member, including:
        obtaining infrared information and/or image information when the operating member operates on the electronic device, including:
            obtaining the infrared information and/or the image information when a stylus is pulled out of the electronic device to determine a handwriting intention;
        retrieving an operation mode cached in a last APP as the first operation mode of the first APP including:
            retrieving the operation mode cached in the last APP within a predetermined time length from a time of caching the operation mode as the first operation mode;
    determining a device mode of the electronic device; and
    displaying an operation window of the first APP on a screen interface of the electronic device at a first target position matching the first operation mode and the device mode;
    wherein:
        the electronic device includes a first display screen and a second display screen; and
        displaying the operation window of the first APP on the screen interface of the electronic device at the first target position matching the first operation mode and the device mode includes:
            in response to the device mode being a book mode, displaying the operation window of the first APP on a first display screen of the electronic device matching the first operation mode, and displaying a reference window configured to provide handwriting reference information on a second display screen of the electronic device different from the first display screen.

2. The method of claim 1, wherein obtaining the first operation mode of the operating member includes:
    detecting a first position of a nib of a stylus on the electronic device, detecting a second position of a hand palm of an operator on the electronic device, and determining the first operation mode of the operating member based on the first position and the second position.

3. The method of claim 1, wherein obtaining the first operation mode of the operating member includes:
    determining the first operation mode of the operating member based on the infrared information and/or the image information.

4. The method of claim 1, wherein obtaining the first operation mode of the operating member includes:
    obtaining grip information of the operator on the electronic device when the operating member operates on the electronic device, and determining the first operation mode of the operating member based on the grip information.

5. The method of claim 1, wherein determining the device mode of the electronic device includes:
    performing attitude sensing on the electronic device to obtain attitude sensing information of the electronic device; and
    determining the device mode of the electronic device based on the attitude sensing information.

6. The method of claim 1, wherein in response to exceeding the predetermined time length, obtaining the first operation mode based on a detection manner and caching the first operation mode in the first APP.

7. The method of claim the device 1, wherein the device mode of the electronic device includes one of the book mode, a laptop mode, or a tablet mode.

8. The method of claim 7, wherein at least displaying the operation window of the first APP on the screen interface of the electronic device at the first target position matching the first operation mode and the device mode includes:
    in response to the device mode being the laptop mode, determining a third display screen of the electronic device in a flat status, displaying the handwriting window in a first area on the third display screen matching the first operation mode, and displaying a reference window in a second area on the third display screen different from the first area, or displaying the handwriting window on the third display screen and displaying the reference window on a fourth display screen different from the third display screen, the third display screen and the fourth display screen each being one of the first display screen and the second display screen.

9. The method of claim 7, wherein at least displaying the operation window of the first APP on the screen interface of the electronic device at the first target position matching the first operation mode and the device mode includes:
    in response to the device mode being the tablet mode, displaying the handwriting window in a third area on a whole screen interface of the electronic device matching the first operation mode and displaying a reference window in a fourth area on the whole screen interface different from the third area, the whole screen interface being a display screen provided by joining the first display screen and the second display screen.

10. An electronic device, comprising:
one or more display screens;
a memory, configured to store at least an instruction set; and
a processor, configured to call and execute the instruction set in the memory to:
  determine an APP running front-end on the electronic device;
  in response to a first APP being displayed on a front-end of the electronic device, obtain a first operation mode of an operating member, including:
    obtaining infrared information and/or image information when the operating member operates on the electronic device, including:
      obtaining the infrared information and/or the image information when a stylus is pulled out of the electronic device to determine a handwriting intention;
    retrieving an operation mode cached in a last APP as the first operation mode of the first APP including:
      retrieving the operation mode cached in the last APP within a predetermined time length from a time of caching the operation mode as the first operation mode;
  determine a device mode of the electronic device; and
  display an operation window of the first APP on a screen interface of the display screen of the electronic device at a first target position matching the first operation mode and the device mode;
wherein:
  the one or more display screens include a first display screen and a second display screen; and
  displaying the operation window of the first APP on the screen interface of the electronic device at the first target position matching the first operation mode and the device mode includes:
    in response to the device mode being a book mode, displaying the operation window of the first APP on a first display screen of the electronic device matching the first operation mode, and displaying a reference window configured to provide handwriting reference information on a second display screen of the electronic device different from the first display screen.

11. The device of claim 10, wherein the processor is configured to determine the first operation mode by performing:
  detecting a first position of a nib of a stylus on the electronic device, detecting a second position of a hand palm of an operator on the electronic device, and displaying the first operation mode of the operating member based on the first position and the second position.

12. The device of claim 10, wherein the processor is configured to determine the first operation mode by performing:
  determining the first operation mode of the operating member based on the infrared information and/or the image information.

13. The device of claim 10, wherein the processor is configured to determine the first operation mode by performing:
  obtaining grip information of the operator on the electronic device when the operating member operates on the electronic device, and determining the first operation mode of the operating member based on the grip information.

14. The device of claim 10, wherein, to determine the device mode, the processor is further configured to:
  perform attitude sensing on the electronic device to obtain attitude sensing information of the electronic device; and
  determine the device mode of the electronic device based on the attitude sensing information.

* * * * *